United States Patent [19]

Grunberg et al.

[11] 3,975,638

[45] Aug. 17, 1976

[54] METHOD AND DEVICE FOR LOCALIZATION OF IONIZING PARTICLES

[75] Inventors: Claude Grunberg, Versailles; Jean Le Dévéhat, Longjumeau, both of France

[73] Assignee: Commissariat a l'Energie Atomique, Paris, France

[22] Filed: Oct. 29, 1974

[21] Appl. No.: 518,992

[30] Foreign Application Priority Data

Nov. 7, 1973 France ............................ 73.39574

[52] U.S. Cl. ............................... 250/385; 250/370; 313/93

[51] Int. Cl.[2] ........................ G01T 1/22; G01T 1/18

[58] Field of Search ............... 250/385, 370; 313/93

[56] References Cited

UNITED STATES PATENTS

| | | | |
|---|---|---|---|
| 2,692,948 | 10/1954 | Lion | 313/93 |
| 3,383,538 | 5/1968 | Bowyer | 250/385 |
| 3,418,474 | 12/1968 | Spergel et al. | 250/385 |
| 3,676,682 | 7/1972 | Falk | 250/385 |
| 3,703,638 | 11/1972 | Allemand et al. | 250/385 |

*Primary Examiner*—Harold A. Dixon

*Attorney, Agent, or Firm*—William R. Woodward

[57] ABSTRACT

An array of needle point anodes has its points uniformly spaced from a sheet cathode. Ionization occurring in an ionizable medium causes electron multiplication in the high electric field of the nearest anode point. A semiconductor solid may be the ionizable medium, instead of the usual gaseous or liquified rare gas. The pulse count rate is individually measured for each anode, or for each cathode segment when the anodes are connected together and a segmented cathode is used, to locate the trajectory and measure the flux of ionizing particles.

3 Claims, 11 Drawing Figures

METHOD AND DEVICE FOR LOCALIZATION OF IONIZING PARTICLES

This invention relates to a method of two dimensional localization of the trajectory of ionizing particles and a localization detector for carrying out the method in accordance with the invention.

A large number of experiments require a knowledge of the trajectory of ionizing particles and of the particle flux at one point of a surface.

It is known that experimental devices have been employed in the prior art for measuring particle trajectories and fluxes. One method for measuring flux consists for example in dividing a surface for the detection of ionizing particles into small cells, each cell being intended to perform the function of an independent detector. This device is commonly constructed with a semiconducting mosaic.

Wire chambers are also employed. In order to determine the trajectory of a particle, two wire chambers placed in back-to-back relation are employed and the wires of these latter extend in orthogonal directions. A radiation localization detector which makes use of wire chambers is described in U.S. Pat. No 3,703,638 filed on May 22, 1970.

However, wire chambers are delicate since the wires are fine and must be under high mechanical tension. This essential requirement results in difficult cconstruction and in a high cost price. Furthermore, since the wires are stretched, the structure necessarily constitutes a ruled surface.

The present invention relates to a method of two-dimensional localization of an ionizing particle trajectory. The particles traverse the space formed between an anode and a cathode which are brought to a potential difference of several thousand volts.

In more exact terms, the method essentially consists in determining the point of impact of the particle by means of the variations in potential of the points which form the array such as for example a rectangular array of points constituting the anode, each point being intended to operate as an independent counter.

In the case in which the ionizing particles penetrate into the space formed between the anode and the cathode in a direction approximately parallel to the points, the measurement of the count rate at a number of points makes it possible to determine the particle trajectory.

By way of example, the counters operate either in the proportional counter regime or in the Geiger counter regime.

In a proportional counter, the amplitude of the electrical signal collected between the anode and the cathode in the case of the invention between one point and the cathode is proportional to the number of ions created by the particle within a small space located around the point of the anode or can in other words be considered to be proportional to the energy lost by said particle within said space. The amplitude of the pulse is dependent on this energy.

Proportional counters are based on the principle of gas multiplication; postulating that a single pair of ions is formed by the ionizing particle, the positive ion drifts slowly towards the cathode and the much lighter electron rapidly reaches a region of intense electric field which surrounds the point and is accelerated in this region. As a result of collisions, this electron creates further electron-ion pairs, in which these electrons are accelerated and so forth. A Townsend avalanche takes place around the point within a limited region; this gas multiplication takes place each time the electric field within a gas chamber exceeds a critical value which depends on the nature and the pressure of the gas. This intense electric field ($3 \times 10^5$ volts per cm in argon at a pressure of 760 mm) which must be highly localized if it is desired to ensure that the multiplication is independent of the locus of passage of the particle is produced in the vicinity of the electrode which has a sufficiently small radius of curvature of surface to ensure that the electric field has the desired value. Two forms can be employed:

the cylinder (which is the case of a wire), this system being employed in multi-wire proportional counters;

the sphere: it is not feasible in practice to employ a complete sphere so that use will accordingly be made of a cylinder terminating in a half-sphere or alternatively a needle whose point has a shape approximating to a half-sphere.

The form of electrode just mentioned has been profitably employed in the construction of a gas multiplication detector or so-called point chamber.

For the practical application of the method, this invention entails the use of a detector for the localization of ionizing particles which is distinguished by the fact that the anode is constituted by a rectangular array for example of points which are disposed at a constant distance from the cathode and the axes of which are perpendicular to the cathode aforesaid.

In one embodiment of the invention, the cathode is a continuous sheet of conducting material on which is placed an ionizable semiconducting solid block and the anode points are constituted by needles which have a diameter of approximately 1 mm, a length of a few centimeters and the point of which has a radius of curvature of the order of 10 microns. Each point projects into the ionizable solid block and is connected to ground through a resistor; a means for measuring potential is employed for recording the voltage developed across the terminals of each resistor.

The data are thus taken directly from each point, which necessitates electrical independence of each needle: the needles are mounted on an insulating support. The connection between the needle and the resistor (as well as the voltage-measurement systems) is made either by soldering or by wrapping or by any other method resulting in the formation of a contact which permits the transmission of pulses having an amplitude of approximately 10 millivolts and a width of 20 nanoseconds. These pulses correspond to the voltage pulse within a 200-ohm resistor at the time of passage of an ionizing particle. The electronic datacollection circuit can be provided with connection elements which perform the function of points, in which case the point support is the same as the electronic circuit support.

In an alternative embodiment of the invention, the points which form part of one or a number of rows are short-circuited, each row being connected to ground through a resistor; the voltage developed across the terminals of each resistor aforesaid is recorded by potential measurement means. In this case the row of points performs the function of a wire.

By this means, the wire is replaced by a series of points and this offers certain advantages such as enhanced strength and ruggedness as well as a reduction of crosstalk as will be explained hereinafter.

In accordance with another alternative embodiment of the invention, the groups of points are shortcircuited, said groups being connected to ground through a resistor and the voltage developed across the terminals of each resistor aforesaid is measured by potential measurement means. These connections can be established by means of jack plug and socket systems outside the measuring chamber in order to adapt the apparatus to the desired degree of precision in the localization of trajectories.

In these alternative embodiments, the cathode is fabricated from an electrically conductive sheet (such as a metallic sheet, for example) which is brought to a direct-current and negative potential of several thousand volts.

Said cathode is placed parallel to the surface defined by the points and can be constituted by a metallic grid, by a thin printed-circuit sheet or by a metallic sheet.

The detection device for determining the amplitude of the potential developed across the terminals of each resistor and the position of the point in the array of points to which said resistor corresponds may, for example, be identical with that described in U.S. Pat. No. 3,703,638 filed on May 22, 1970.

In an alternative embodiment of the invention, the anode of the detector is constituted by an array of points electrically connected to each other; in this case, the cathode is divided into sections which are electrically insulated from each other and the space between the points and the cathode segments is occupied by an ionizable gas, liquid or semiconducting solid. The pulse is collected at the terminals of a resistor which is connected to the cathode either directly or through an insulating capacitor, depending on the point of grounding of the high voltage, each section being connected to ground through a resistor and a voltage measurement system being connected to the terminals of said resistor.

In this alternative embodiment, a measurement is taken of the charge developed by influence on the cathode; the anode which is brought to a positive high voltage only has an amplification function and the entire quantity of necessary information is collected at the cathode. The charge on the cathode which is produced by influence is proportional to the charge deposited on each point.

In a further embodiment of the invention, the cathode is divided into rectangular strips each having a width approximately equal to the distance between the points of the anode and the cathode.

In another embodiment of the invention, the anode is formed by a single conducting block which forms an array of machined pyramids in which the radius of curvature at the vertex of each pyramid is of the order of 10 microns.

In the embodiments of the invention utilizing a gas as the ionizable medium, by way of example, the filling gas is a mixture of argon and ethyl bromide or a mixture of argon and trichloroethane. In those embodiments where the ion multiplication medium is a liquid which is a liquified rare gas such as liquid xenon for example.

Further properties and advantages of the invention will become more readily apparent from the following description of exemplified embodiments which are given by way of explanation and not in any limiting sense, reference being made to the accompanying drawings in which.

Figure 1:
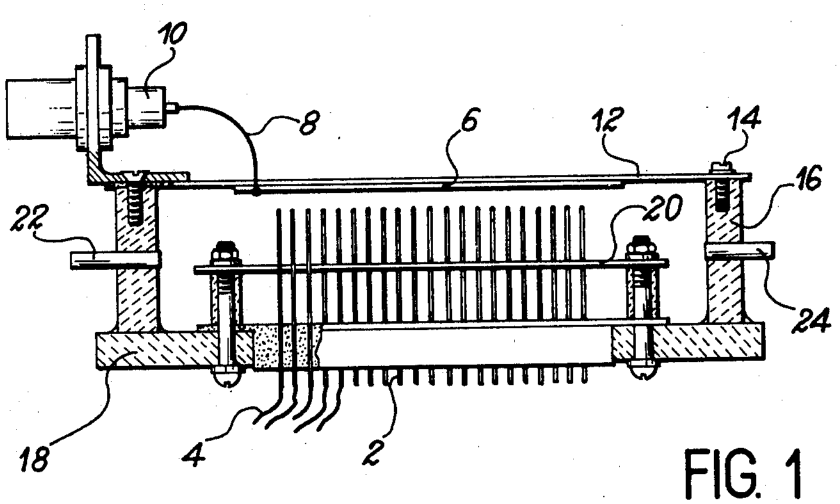
FIG. 1 is a diagram of the constructional assembly of the detector in accordance with the invention.
Figure 9:
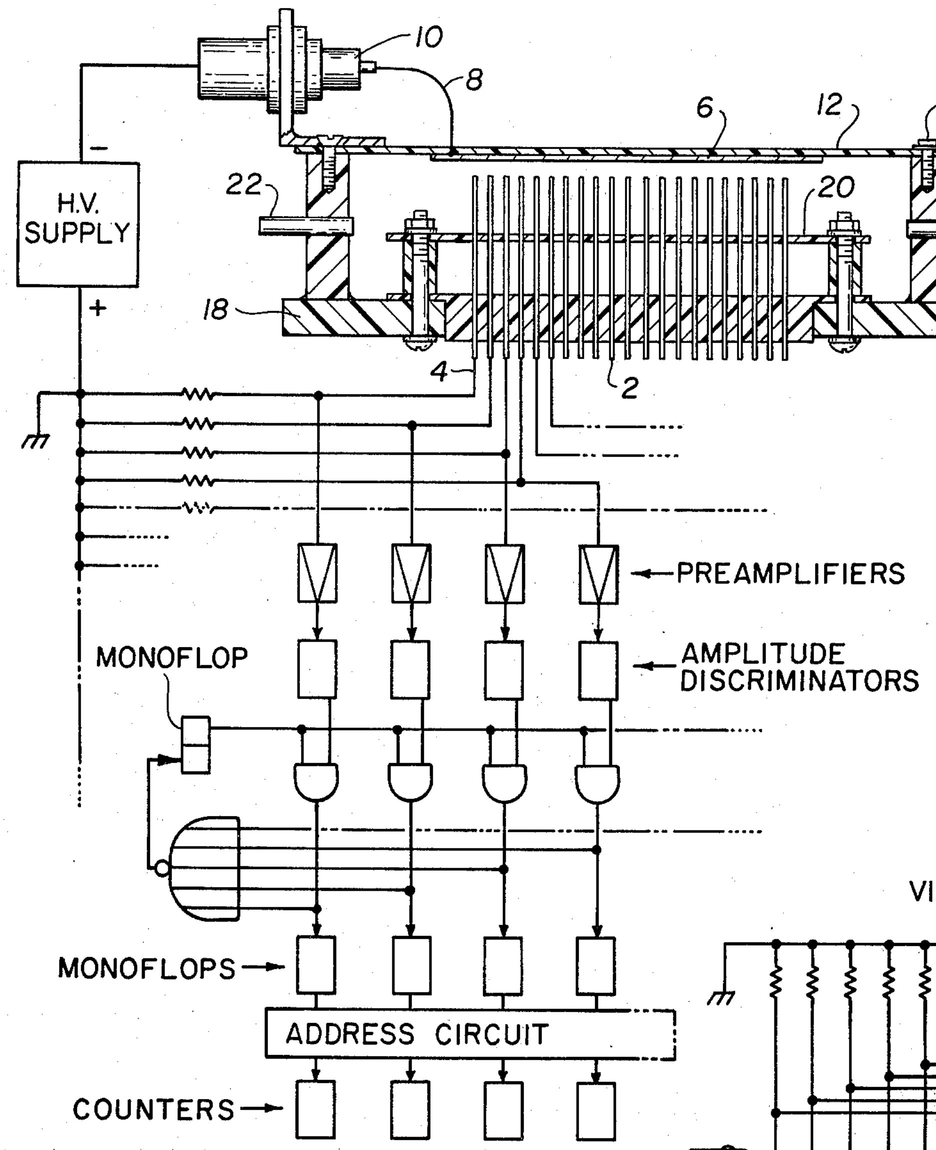
Figure 10:
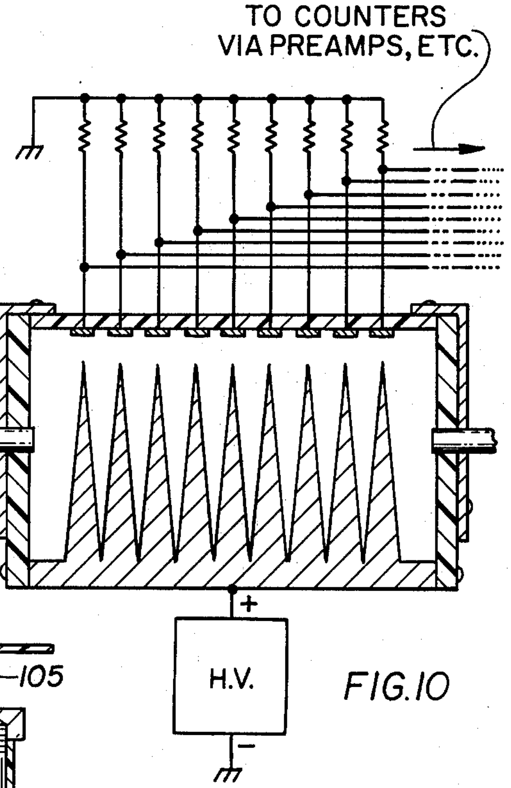
Figure 11:
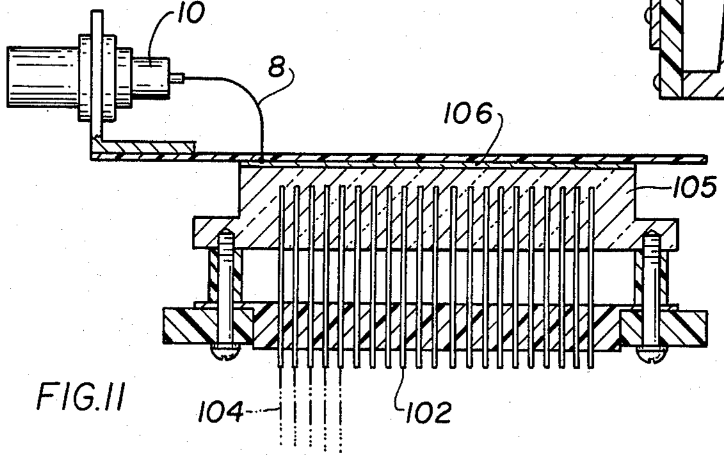

FIG. 9 shows the detection circuit of U.S. Pat. No. 3,703,638 connected to the detector structure of FIG. 1;

FIG. 10 shows a detector in which the cathode is segmented into individual cathodes and the anode points are part of an electrically unitary anode, and FIG. 11 shows a detector of the type of FIG. 1 using a semiconductive solid ionizable medium.

As has already been mentioned, the invention consists in determining the trajectory of a particle and in measuring the particle flux by recording the variations in potential either in a system of points constituting the anode or in cathode sectors. Each point plays the part of a separate and independent counter. In other words, the conditions of electric field in the vicinity of the point are such that an electron charge multiplication takes place in the immediate vicinity of said point. The volume around the point in which this gas multiplication takes place is small with respect to the volume between the two electrodes, with the result that the amplification is independent of the position of the ionizing particle.

The determination of the points in which the potential variations occur indicates the intersection of the particle trajectory; the amplitude of these variations indicates the energy of the incident particles in the case in which the counters operate in the proportional counter regime.

In accordance with the invention, there is a very short distance between the needles which are not separated by metal plates as in the prior art. It has thus been possible to increase the number of measuring chambers, provision being made for $10^4$ independent detectors for a surface of side 10 cm, as well as to determine the localization of the particle impact. Moreover, as a result of the absence of metal plates, the detector absorbs a smaller number of particles in the metallic portions of this latter.

There is shown in FIG. 1 a sectional view of the detector for localization of ionizing particles according to the invention with the array of needles such as the needles 2 to which are connected electric wires or leads such as the lead 4; these leads are connected to resistors which are in turn connected to ground and to an electronic counting circuit (not shown in the figure). The array of needles such as 2 constitutes the anode whereas the cathode 6 consisting for example of a metal sheet is connected to the high voltage by the lead 8, said lead being connected to the high-voltage supply terminal 10. The cathode 6 is attached to a glass fiber support 12, said support being mounted by means of screws such as the screw 14 on the Plexiglas chamber frame 16. The needles are fixed in the glass fiber plates 18 and 20 which are pierced by holes 0.8 mm in diameter. The distance between each needle is 2.54 mm. The end-pieces 22 and 24 are connected to a gas circulation system which is not shown in the figure. The known devices for identification and measurement of potential in the different leads such as 4 have not been illustrated in FIG. 1; one example of a measurement and identification device is given in U.S. Pat. No. 3,703,638 filed on May 22, 1970 and this example is reproduced in FIG. 9, as connected to the detector of FIG. 1.

Figure 2:
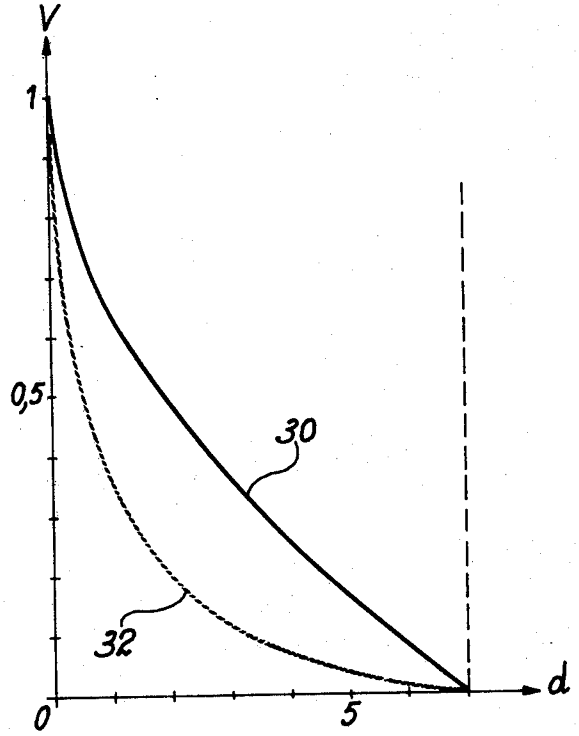
FIG. 2 shows the shapes of the equipotential curves in the case of a wire and in the case of a sphere in respect of the same anode-cathode distance.

There are shown in FIG. 2 the shapes of the potential curves in respect of a cylindrical wire and a sphere which are both located at the same distance from a flat cathode. The potential is standardized at one unit either in the wire or in the sphere. The cylindrical wire and the sphere have the same radius of curvature; the distance between the anode and the cathode is 7 mm. The potential V is plotted as ordinates and the distance d is plotted as abscissae. The full line curve 30 represents the variation of potential in the case of a wire whilst the dashed curve 32 represents the variation of potential in the case of a sphere.

In both of these cases, the radial electric field $E$ is of the form:

$$E = K/r^n$$

where $K$ is a constant and $r$ is the radius of curvature of the anode surface; $n$ is equal to 1 in the case of a cylindrical wire and equal to 2 in the case of a spherical anode.

In the case of the spherical geometry, the long-distance electric field varies more slowly than in the cylindrical geometry. In the vicinity of the anode, the electric field varies more rapidly in the case of a spherical electrode than in the case of a cylindrical electrode. From this it follows that the spherical or hemispherical electrode according to the invention has a more advantageous shape for obtaining a small multiplication volume, that is to say a volume in which the electric field has a sufficient value to give rise to the gas multiplication process. As the volume is smaller, so the gas multiplication takes place more readily and is more independent of the trajectory of the ionizing particle.

However, if a complete sphere cannot be employed, it is a desirable objective to come as close to this latter as possible. In one embodiment of the invention, the anode is formed of a fine needle having an approximately hemispherical extremity. Each needle performs the function of an independent proportional counter.

The point chamber consists of two separate and independent portions:

The first portion is formed by the array of needles supported by the two plates 18 and 20 which are pierced by holes. These two plates consist, for example, of a perforated sheet of insulating resin. It is also possible to employ a sheet of polystyrene placed between two thin sheets of epoxy resin, thus making the structure more rigid and more transparent to particles. The needles can be standard sewing needles made of nickel steel. It has been observed that a gold deposit increased the length of life of the needles.

The second portion of the point chamber is the cathode. Among the many solutions which can be adopted for the fabrication of this portion, consideration can be given to the following in increasing order of thickness:

a metallic grid, a thin printed circuit (having a thickness of less than 0.5 mm), a sandwich structure composed of polystyrene between two thin sheets clad with copper, a conventional printed circuit for high-energy particles which are capable of traversing greater thicknesses.

All measurements have been carried out with the following geometry:

a distance of 2.54 mm between the needles, a spacing of 7 mm between the points of the needles and the cathode.

Figure 3:
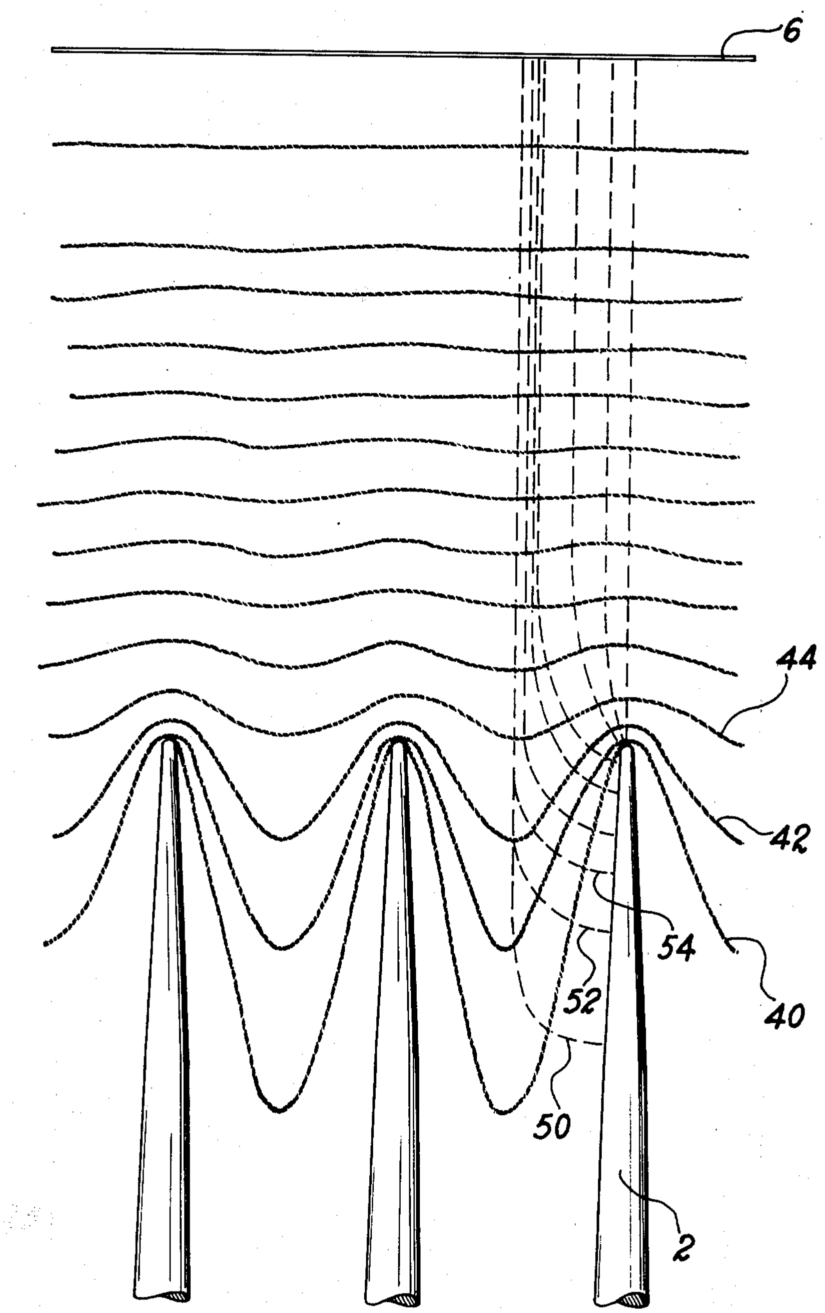
FIG. 3 shows the shapes of the equipotential curves in the case of needles.

FIG. 3 shows the needles such as 2 which are placed opposite to the cathode 6 and the equipotential lines such as those designated by the references 42 and 44. The electric field lines 50, 52, 54 at right angles to the preceding are shown in dashed lines.

The equipotential lines are practically straight lines at a distance from the points of the same order of magnitude as the distance between the points; furthermore, the intense electric field region is localized around the needle point.

Only a very small portion of the point chamber is ineffective or in other words does not count particles; this volume is located in the vicinity of the mid-plane between two needles. The ionizing particles which travel parallel to the needles within this volume produce primary electrons which do not reach the high electric field regions on the needles. This so-called "dead region" depends on the shape of the point and tends to become negligible when the point is a hemisphere.

It is worthy of note that electric charges are deposited on all surfaces which intersect the equipotential lines. If such an insulating surface is located in the immediate vicinity of the needle points, the quantity of charge deposited will modify the distribution of the electric field in the vicinity of the points; it is for this reason that the needle support 20 is placed at a distance of a few centimeters from the needle points. In the prototype which has been constructed, this distance of two centimeters is wholly sufficient.

Figure 4:
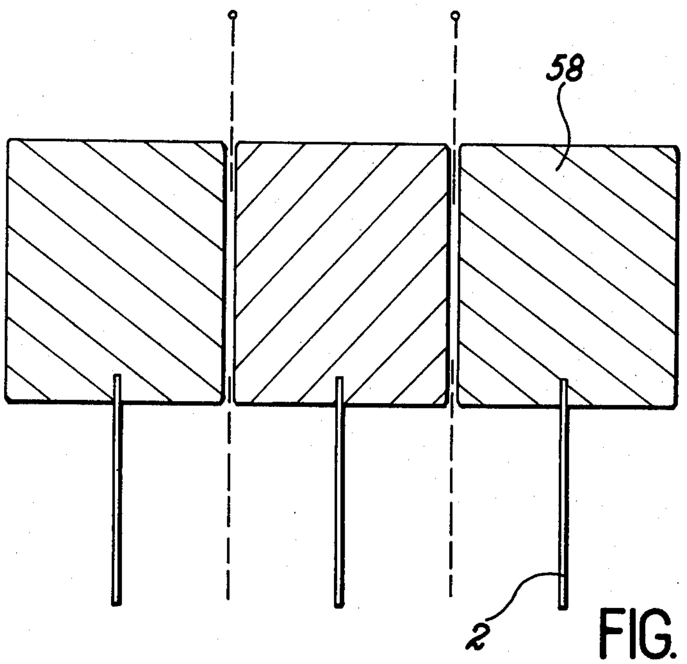
FIG. 4 shows the active volumes around the needle points.

The active regions around each needle are shown in FIG. 4. For reasons of simplification, it will be assumed that these active regions have the shape of a rectangular parallelepiped so that it is only necessary to know the height of said regions in order to determine the efficiency of the device. When a flux $\Phi$ of particles passes through an effective cross-section $S_1$, there is counted a number $N$ of particles given by the formula:

$$N = \Phi \times S_1$$

In the case of a particle flux having a trajectory which is parallel to the needles, the effective crosssection $S_1$ is $2.54 \times 2.54$ mm$^2$; in the case of particles which arrive at right angles to the needles, the effective cross-section $S_2$ is equal to $h \times 2.54$ where $h$ is the height of the active region. When employing 12 % of ethyl bromide, the height of the active region designated by the reference 58 in FIG. 4 is 2.68 mm. This height changes relatively little as a function of the potential difference between anode and cathode.

Figure 5:
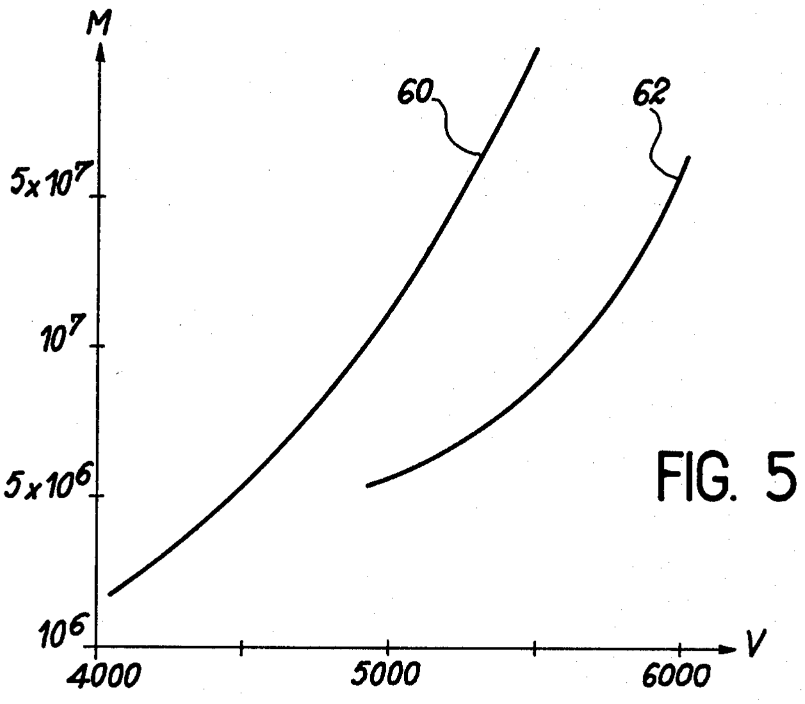
FIG. 5 represents the amplification factor as a function of the voltage applied between points and cathode.

FIG. 5 represents the variations in the multiplication factor as a function of the potential difference between the points of the anode and the cathode. Curve 60 represents these variations in the case of a mixture of 8 % ethyl bromide and 92 % argon; curve 62 represents the same variations in the case of 12 % ethyl bromide in 88 % argon. Mixtures of trichloroethane and argon are also useful as the ionizable gas.

Figure 6:
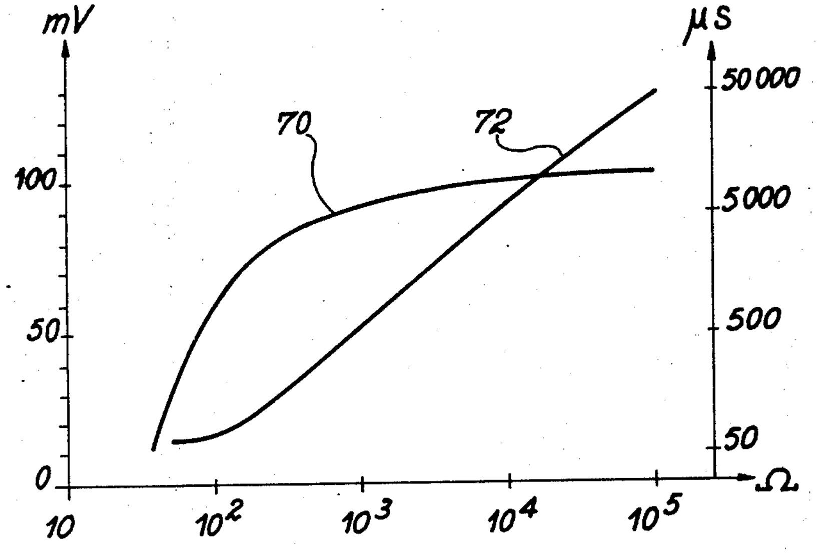
FIG. 6 represents the amplitude and the timewidth of the signals as a function of the impedance in ohms in series with each point.
Figure 7:
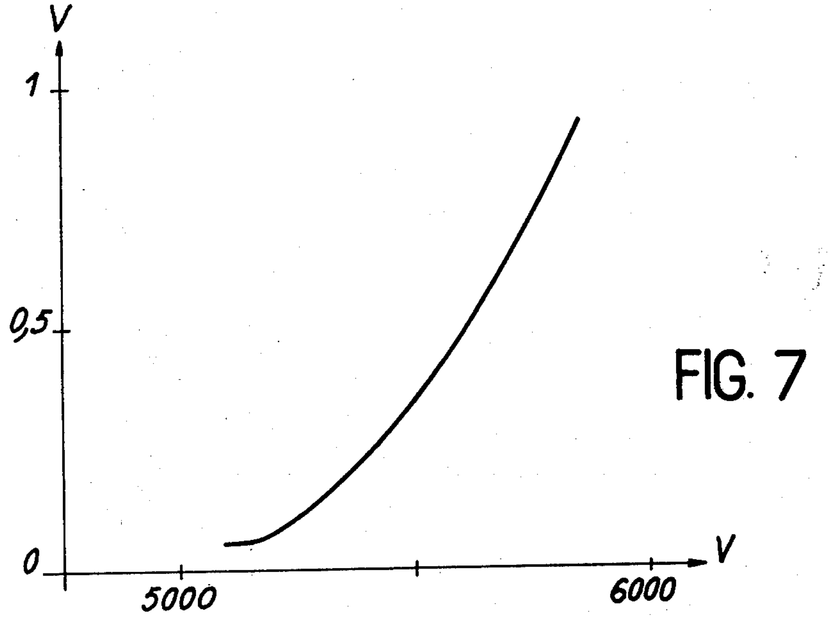
FIG. 7 represents the height of the pulse corresponding to the passage of a particle as a function of the potential difference between anode and cathode.

FIG. 6 represents the amplitude of the signals in millivolts as a function of the impedance in ohms placed in series with the different needles. This curve is represented at 70. In the same figure, the time-width of the pulse in microseconds is represented as a function of the impedance on the curve 72. It is apparent that the more the impedance increases, the stranger is the signal, but also the longer is its time-duration. In the case of a resistance of 200 ohms, the amplitude is 10 millivolts and the multiplication factor is $1.3 \times 10^6$. The variations in amplitude as a function of voltage have been represented in the particular case in which the needles were connected only to a capacitor having a value of 1.5 picofarad as represented in FIG. 7. In this figure, the voltage measured in volts is plotted as ordinates as a function of the potential difference in volts between anode and cathode.

The maximum count rate is determined by the saturation effects within the chamber and by the detection threshold compared with the mean amplitude of the pulse. The saturation effects are characteristic of the chamber and are dependent on the particle flux through the counter. On the other hand, the amplitude of the pulses depends on the experimental conditions and on the charge impedance of each needle. In the case of resistors having a value of 200 ohms which connect each needle to ground, the threshold in 5 millivolts, which gives a maximum count rate per needle of $2 \times 10^5$ counts per second; this corresponds to a particle flux of $3.3 \times 10^6$ $cm^{-2}$ $S^{-1}$.

So far as crosstalk is concerned this is primarily due, as in multiple wire chambers, to capacitive coupling effects between the needles and to the positive charges induced in the needles in the vicinity of the particular needle at which the gas multiplication takes place. The initial effect can usually be disregarded except when the capacitive coupling between needles is of very high value (at least several hundred picofarads). Tests have shown that crosstalk in the needles located nearest to a given needle did not rise to an unwanted potential of more than 8 % of the potential developed in said needle.

Figure 8:
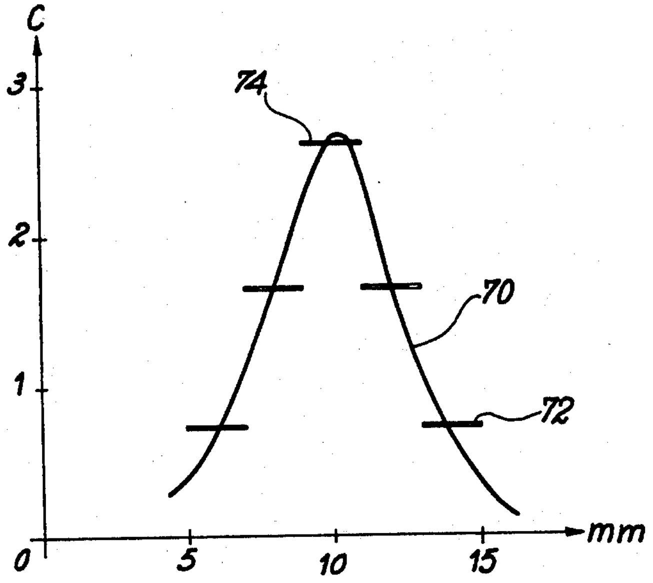
FIG. 8 shows the charge density on the strips forming the cathode in the case of a particle which passes at the center in a direction parallel to the central strip.

It is possible to collect the information, not on the different needles which form the anode but directly at the cathode; in this case the localization is performed by dividing the cathode into strips or into indpendent portions as shown in FIG. 10. Satisfactory localization is achieved as can be noted from FIG. 8 for strip cathodes; curve 70 of FIG. 8 represents the distribution of charges induced at the cathode in respect of a charge deposited on a needle located opposite to the central strip; the cathode is formed of independent copper strips such as 72 and 74 having a thickness of 1.9 mm and separated by 0.1 mm of insulating material. The mid-height resolution is 5.5 mm, namely approximately the distance between the cathode and the points. This result is improved by reducing the width of the strips and the interval between points and cathode and by making use of a suitable electronic circuit.

The point chamber is of appreciable interest either in the form of construction in which each point is independent or in the form of construction in which the points constituting the anode are interconnected and the information is collected at the cathode. The main advantage is the versatility of a detector of this type which can be employed as an XY detector for any application in which a plane image is indispensable such as medical applications, any type of radioscopy and so forth.

Furthermore, the replacement of the wire chamber by a point chamber increases the strength and ruggedness of the detector for localization of ionizing particles. The count rate per unit of surface is of a high order and an image of a radiogram can be recorded electronically; moreover, the points can be connected to each other in accordance with requirements, depending on the spatial resolution which it is desired to obtain; the capital cost of a chamber of this type is very low and it is finally possible to form non-planar structures, the sole condition to be observed being to maintain a constant distance between the points and the cathode.

If a semiconducting solid ionizable medium is used instead of a gas or a liquefied gas, the containing chamber becomes unnecessary, as shown in FIG. 11, where the anode needles are set into the semiconductor block 105.

We claim:

1. A detector for two-dimensional localization of the trajectory of ionizing particles comprising:

a multiplicity of cathode electrodes in the form of mutually insulated separate sheet segments of conducting material of such shape and disposition that if they were extended so as to make contact with each other, they would form a continuous sheet;

an anode in the form of a two-dimensional array of elongated pointed elements electrically connected together and having their points respectively opposite said cathodes at a uniform spacing from the respective cathodes, the space between said anode and said cathodes being free of metallic obstructions;

a chamber for maintaining an ionizable gas unobstructedly between said anode and said cathodes and between the elongated pointed elements of said anode for a substantial length thereof away from their points, said chamber being constructed so as to permit independent electrical connections to the respective cathodes and to said anode outside the chamber;

an ionizable gas in said chamber;

means for applying an electric potential of the order of a few thousand volts between said anode and said cathodes, and means, including impedances interposed between said cathodes, respectively, and said electrical potential applying means, for detecting the points of impact and of flux of ionizing particles by measuring the count rate of electrical pulses at each cathode.

2. A detector according to claim 1 in which the surfaces of said cathodes lie in a plane and in which the points of said anode are uniformly distributed in a plane.

3. A detector for two-dimensional localization of the trajectory of ionizing particles comprising:

a cathode electrode in the form of a continuous sheet of conducting material;

an ionizable semiconducting solid block adjacent one surface of said cathode;

a multiplicity of anodes in the form of a twodimensional array of needles projecting in said semiconducting solid block and having their points uniformly spaced from said cathode;

means for applying an electric potential of the order of a few thousand volts between said cathode and said anode, and.

means, including impedances interposed between said anodes, respectively, and said electric potential applying means, for detecting the points of impact and the flux of ionizing particles by measuring the count rate of electrical pulses at each anode.

* * * * *